United States Patent Office 3,253,987
Patented May 31, 1966

3,253,987
5-NITRO-2-FURALDEHYDE - 2 - ETHYL SEMICARBAZONE BLACKHEAD CONTROL COMPOSITIONS AND METHOD OF USING SAME
Cornell Alvin Johnson, Norwich, N.Y., assignor to The Norwich Pharmacal Company, a corporation of New York
No Drawing. Filed Sept. 4, 1962, Ser. No. 221,325
2 Claims. (Cl. 167—53.1)

This invention relates to veterinary medicine and is concerned with novel compositions adapted for the control of histomoniasis, which is sometimes referred to as infectious enterohepatitis and most commonly called blackhead, which term will be used herein, in Aves. More particularly this invention is concerned with novel compositions containing 5-nitro-2-furaldehyde - 2 - ethyl semicarbazone useful for the prevention and control of blackhead in poultry, especially in turkeys.

Blackhead is a frequently encountered disease of poultry causing severe economic loss to the grower unless its appearance in the poultry flock is diligently watched for and its progress promptly counteracted when observed. Precise husbandry to curtail this disease poses insurmountable obstacles in practice necessitating resort to agents effective in its alleviation to impart confidence to the raiser that appropriate management coupled with therapy will prevent ravage of the flock.

In the turkey, blackhead is caused by the protozoan *Histomonas meleagridis*, which affects the ceca and liver, by the ingestion thereof or of the cecal worm *Heterakis gallinae* which provides a haven for that protozoan. Prognosis of the disease is poor. Mortality occurs in high percentage. When the birds do not sucumb to the disease, they are so inferior in quality that they are substantially an economic loss.

I have discovered that 5-nitro-2-furaldehyde-2-ethyl semicarbazone upon oral administration in relatively low and substantially non-toxic amounts to turkeys evinces a surprisingly effective therapy in the control of blackhead. In the practice of my invention I have found that combining 5-nitro-2-furaldehyde-2-ethyl semicarbazone with the feed supply is an easy and convenient method for its administration. This combination is readily effected by admixing the active ingredients, 5-nitro-2-furaldehyde-2-ethyl semicarbazone, with commonly used elements of poultry sustenance such as grains, soybean meal, fish meal, vitaminaceous sources, alfalfa meal, mineral components and mixtures thereof by grinding, stirring or tumbling in apparatus conventionally used for that purpose. The preparation of 5-nitro-2-furaldehyde-2-ethyl semicarbazone is fully disclosed in Journal of Organic Chemistry, vol. 14, page 813, 1949.

The amount of active ingredient required to provoke an effective therapeutic management of blackhead is within the range of about 0.0085% to about 0.022% by weight of the ultimate composition in which it is offered. It is apparent that lesser amounts of active agent will suffice when compositions containing it are provided prophylactically and greater amounts are indicated when fulminating, acute infections are encountered.

Illustrative of the beneficial results afforded by the oral administration of 5-nitro-2-furaldehyde-2-ethyl semicarbazone to turkeys exposed to and infected by *Histomonas meleagridis*, in accordance with my invention, are the following examples:

EXAMPLE I

*Prophylactic test*

One hundred-thirty two straight run, broad breasted White Holland turkey poults, twenty-three days of age, were wing banded, weight balanced, and were distributed into three groups of forty-four birds. They were then placed in floor pens measuring 11′ x 9′ with a total area of 99 sq. ft. Adequate space was available to the poults for the first six weeks of the study since each turkey poult from one to nine weeks old requires a minimum of one square foot of floor pen space for maximum growth and development. Each floor pen was equipped with a hanging feeder with a capacity of forty pounds and with a metal waterer. All poults were maintained on non-medicated standard turkey starter mash for three days after transference to the floor pens. At the end of the three day period, all of the poults were individually weighed and the two groups of poults were inoculated perorally with approximately three hundred fully embryonated *Heterakis gallinae* ova suspended in 1 ml. volumes of 0.75% carboxy-methyl-cellulose. Immediately after inoculation, one group received the following medication ad libitum in standard turkey starter mash:

Group I—5-nitro-2-furaldehyde - 2 - ethyl semicarbazone (0.011%)
Group II—Inoculated control—no medication.
Group III—Non-inoculated control—no medication.

The poults were weighed individually at weekly intervals and all poults which died were autopsied and the livers and ceca examined for evidence of blackhead infection.

Thirty-seven days after inoculation, at which time the poults were nine weeks old, all groups were weighed and reduced in number to twenty poults in order that each remaining poult would have the minimum of four square feet of floor pen space required for optimal growth and development to market age. The poults selected for elimination comprised both the lightest and the heaviest poults in a group, and those closest to the mean weight were retained.

The remaining twenty poults were maintained for an additional forty-two days. During this time weekly weight gains were again recorded.

Feed consumption records were kept throughout the entire period of seventy-nine days in order that feed conversion values could be calculated. The results are depicted in the following table:

| Group | Mortality | | Periodic Mean Weights of Poults in Grams | | | | | | | | | | | | | Total Average Gain | Feed Conversions |
|---|---|---|---|---|---|---|---|---|---|---|---|---|---|---|---|---|---|
| | D/t | Percent | 5/12 | 5/15 [1] | 5/23 | 5/31 | 6/6 | 6/13 | 6/21 [2] | 6/28 | 7/12 | 7/15 | 7/19 | 7/26 | 8/2 | | |
| I | 3/44 | 6.8 | 268.0 | 319.0 | 635.8 | 918.0 | 1,216.5 | 1,562.9 | 1,882.8 | 2,436.8 | 2,960.9 | 3,475.9 | 3,943.0 | 4,301.0 | 4,562.2 | 4,294.2 | 2.92 |
| II | 19/44 | 43.2 | 268.0 | 307.0 | 610.6 | 751.2 | 1,063.3 | 1,575.6 | 1,920.3 | 2,378.3 | 2,861.5 | 3,374.6 | 3,748.8 | 4,033.1 | 4,487.8 | 4,219.8 | 3.34 |
| III | 0/44 | | 271.0 | 325.4 | 610.9 | 983.7 | 1,300.1 | 1,646.2 | 2,094.0 | 2,472.2 | 3,081.0 | 3,734.8 | 4,042.8 | 4,551.2 | 4,953.4 | 4,682.4 | 2.62 |

[1] Day of inoculation and start of medication.
[2] All groups were reduced to twenty poults.

EXAMPLE II

Prophylatic test

One hundred and twenty straight run, broad-breasted White Holland turkey poults, two weeks old, were individually weighed, wing banded and weight balanced into six groups of equal numbers. Three groups were assigned at random to replicate number one, and the three remaining groups were assigned to replicate number two. Each replicate, which was maintained in a separate battery in the same cubicle, contained one group medicated with 5-nitro-2-furaldehyde-2-ethyl semicarbazone and two groups maintained without medication which served as inoculated and non-inoculated controls. Medication was incorporated into standard turkey starter mash which was supplied ad libitum for thirteen weeks.

When approximately five weeks old, each of the experimental poults and those maintained for inoculated controls were orally administered 150 embryonated *Heterakis gallinae* ova suspended in one ml. volumes of 0.75% carboxy-methyl-cellulose. Ten days after inoculation, each group was placed in a 9' x 11' floor pen equipped with a hanging feeder and a waterer.

The poults were weighed individually at weekly intervals for the first ten weeks of the experiment, and were weighed for the final time at the end of the thirteenth week when the experiment was terminated. All poults which died during the course of the experiment were weighed, autopsied, and examined for lesions of blackhead. The results are depicted in the following table:

poults were individually weighed and wing banded, and two groups were then inoculated inter-rectally with 1 ml. volumes of a virulent culture of *Histomonas meleagridis*. Each dose contained approximately $4 \times 10^{-6}$ viable histomonads. Six days later, one inoculated group was placed on continuous medication which consisted of 5-nitro-2-furaldehyde - 2 - ethyl semicarbazone (0.0165%) (Group I) in standard turkey starter mash. The second inoculated group (Group II) which served as the inoculated, non-medicated control and the remaining non-inoculated group (Group III) which was used for weight gain comparisons were continued on standard turkey starter mash ad libitum. The poults were individually weighed at weekly intervals and all poults that died during the course of the study were autopsied and examined for gross blackhead pathology. At the termination of the four week floor pen test weekly average percent weight gains and total average percent weight gains were calculated. The results are depicted in the following table:

| Group | Days of Infection Medicated | Mortality | | Periodic Mean Weights in Grams and Percent Gains | | | | | Total Percent Gain 6/30–7/28 |
|---|---|---|---|---|---|---|---|---|---|
| | | D/t | Percent | 6/30 | 7/6 [1] | 7/14 | 7/21 | 7/28 | |
| I | 6–28 | 1/15 | 6.7 | 2,310.4 | 2,750.9 19.1% | 3,065.4 11.4% | 3,512.8 14.6% | 3,831.8 9.1% | 65.9% |
| II | 6–28 | 9/15 | 60.0 | 2,259.3 | 2,653.3 17.4% | 2,263.9 −14.7% | 2,360.2 4.3% | 2,937.5 24.5% | 30.0% |
| III | | 0/15 | 0 | 2,522.6 | 2,893.3 14.7% | 3,333.7 15.2% | 3,713.9 11.4% | 3,959.1 6.6% | 56.9% |

[1] Start of medication.

What is claimed is:

1. A composition for the control of blackhead in poultry comprising in combination a poultry feed and from about 0.0085 to about 0.022% by weight thereof of 5-nitro-2-furaldehyde-2-ethyl semicarbazone.

2. A process for combatting blackhead in poultry which comprises orally administering thereto an element of poultry sustenance having distributed therein 5-nitro-2-furaldehyde-2-ethyl semicarbazone.

| Group | Periodic Average Weights and Average Gains in Grams | | | | | | | | | | | Av. gain at age 15 weeks | Feed efficiency | Percent Mortality due to blackhead |
|---|---|---|---|---|---|---|---|---|---|---|---|---|---|---|
| | Initial Wt.[1] 12/5 | 12/12 | 12/20 | 12/27 [2] | 1/3 [3] | 1/10 | 1/17 | 1/24 | 1/31 | 2/7 | 2/14 | Final Wt. 3/6 | | | |
| REPLICATE NO. 1 | | | | | | | | | | | | | | | |
| 5-nitro-2-furaldehyde-2-ethyl semicarbazone (0.011%) | 140.9 | 311.9 171.0 | 548.6 236.7 | 822.2 273.6 | 1,194.1 371.9 | 1,443.5 249.4 | 1,841.1 397.6 | 2,281.0 439.9 | 2,701.1 420.1 | 3,092.6 391.5 | 3,608.9 516.3 | 5,075.0 1,466.0 | 4,934.1 | 3.15 | 5 |
| Inoculated Control | 141.1 | 301.4 160.3 | 512.6 211.2 | 764.6 252.0 | 1,079.1 314.5 | 1,234.5 155.4 | 1,416.0 181.5 | 1,896.6 480.6 | 2,305.0 408.4 | 2,668.3 363.3 | 3,175.8 507.5 | 4,756.6 1,580.8 | 4,615.5 | 3.49 | 70 |
| Non-inoculated Control | 141.1 | 304.0 162.9 | 533.2 229.2 | 780.9 247.7 | 1,124.4 343.5 | 1,364.3 239.9 | 1,728.0 363.7 | 2,194.5 466.5 | 2,569.7 375.2 | 2,964.5 394.8 | 3,461.5 497.0 | 4,875.1 1,413.6 | 4,734.0 | 3.41 | 0 |
| REPLICATE NO. 2 | | | | | | | | | | | | | | | |
| 5-nitro-2-furaldehyde-2-ethyl semicarbazone (0.011%) | 141.0 | 305.7 164.7 | 532.3 226.6 | 775.0 242.7 | 1,099.8 324.8 | 1,315.3 215.5 | 1,654.0 338.7 | 2,041.1 387.1 | 2,424.7 383.6 | 2,801.1 376.4 | 3,279.4 478.3 | 4,686.1 1,406.7 | 4,545.1 | 3.40 | 5 |
| Inoculated Control | 141.0 | 302.5 161.5 | 513.6 211.1 | 788.5 274.9 | 1,134.2 345.7 | 1,203.0 68.8 | 1,413.0 210.0 | 1,842.0 429.0 | 2,250.0 408.0 | 2,628.0 378.0 | 3,072.0 444.0 | 4,414.0 1,342.0 | 4,273.0 | 3.52 | 75 |
| Non-inoculated Control | 141.0 | 297.5 156.5 | 526.7 229.2 | 756.5 229.8 | 1,102.8 346.3 | 1,349.5 246.7 | 1,678.0 328.5 | 2,123.0 445.0 | 2,549.5 426.5 | 2,958.0 408.5 | 3,391.5 433.5 | 4,723.7 1,332.2 | 4,582.7 | 3.46 | 0 |

[1] Poults were two weeks old when placed on medication (20 birds per group).
[2] Poults were inoculated by gavage with approximately 150 embryonated *Heterakis gallinae* ova.
[3] Poults were moved from cages to floor pens two days after January 3, 1962 weighing.

EXAMPLE III

Delayed medication test

Forty-five ten week old, straight run, broad-breasted White Holland turkeys were randomly divided into three groups of fiteen poults and were placed in 4½' x 5½' floor pens with hanging feeders and metal waterers. All

References Cited by the Examiner

UNITED STATES PATENTS 2,416,234  2/1947  Stillman _____ 260–345

JULIAN S. LEVITT, *Primary Examiner.*

FRANK CACCIAPAGLIA, Jr., *Examiner.*